US009754313B2

(12) United States Patent
Rao

(10) Patent No.: US 9,754,313 B2
(45) Date of Patent: Sep. 5, 2017

(54) SYSTEM FOR PROVIDING INTERACTIVE USER INTEREST SURVEY TO USERS OF MOBILE DEVICES

(75) Inventor: Bindu Rama Rao, Laguna Niguel, CA (US)

(73) Assignee: QUALTRICS, LLC, Provo, UT (US)

( * ) Notice: Subject to any disclaimer, the term of this patent is extended or adjusted under 35 U.S.C. 154(b) by 14 days.

(21) Appl. No.: 13/412,574

(22) Filed: Mar. 5, 2012

(65) Prior Publication Data
US 2012/0164937 A1    Jun. 28, 2012

Related U.S. Application Data

(63) Continuation of application No. 11/821,771, filed on Jun. 25, 2007, now Pat. No. 8,135,331.

(60) Provisional application No. 60/860,700, filed on Nov. 22, 2006.

(51) Int. Cl.
G06Q 10/00        (2012.01)
G06Q 30/00        (2012.01)
G06Q 30/06        (2012.01)
G06Q 30/02        (2012.01)
H04L 29/08        (2006.01)
G06Q 50/16        (2012.01)
H04H 60/33        (2008.01)

(52) U.S. Cl.
CPC ......... *G06Q 30/0641* (2013.01); *G06Q 30/02* (2013.01); *G06Q 30/0217* (2013.01); *G06Q 30/0245* (2013.01); *G06Q 30/0623* (2013.01); *G06Q 50/16* (2013.01); *H04L 67/04* (2013.01); *H04L 67/06* (2013.01); *H04L 67/22* (2013.01); *H04L 67/26* (2013.01); *H04H 60/33* (2013.01)

(58) Field of Classification Search
USPC ....................................................... 705/7.32
See application file for complete search history.

(56) References Cited

U.S. PATENT DOCUMENTS

| 6,098,085 | A  |   | 8/2000  | Blonder et al. |           |
|-----------|----|---|---------|----------------|-----------|
| 6,216,112 | B1 | * | 4/2001  | Fuller         | G06Q 30/02 |
|           |    |   |         |                | 705/14.19 |
| 6,554,618 | B1 |   | 4/2003  | Lockwood       |           |
| 6,823,046 | B2 | * | 11/2004 | Yamade         | H04M 1/642 |
|           |    |   |         |                | 379/88.04 |
| 7,024,381 | B1 | * | 4/2006  | Hastings et al.| 705/27.1  |

(Continued)

OTHER PUBLICATIONS

WebdesignerDepot Staff (The Evolution of Cell Phone Design Between 1983-2009, May 2009).*

(Continued)

*Primary Examiner* — Beth V Boswell
*Assistant Examiner* — Folashade Anderson
(74) *Attorney, Agent, or Firm* — Keller Jolley Preece

(57) ABSTRACT

A system for mobile devices that facilitates the creation and dissemination of user interest surveys to a plurality of mobile devices and PCs/laptops that comprise a user interest survey client component. A computer or PC comprising an user interest survey generator is used to generate audio assisted user interest surveys and communicate it to a distribution server for dissemination. Recipient devices, such as PCs and Mobile devices comprise an user interest survey client component to receive and present user interest survey to a user, gather user interest information, and to send it back to the distribution server or an alternate destination.

19 Claims, 9 Drawing Sheets

(56) References Cited

U.S. PATENT DOCUMENTS

| | | | |
|---|---|---|---|
| 7,261,239 B2 * | 8/2007 | Rao | 235/472.01 |
| 7,337,127 B1 | 2/2008 | Smith et al. | |
| 7,346,545 B2 * | 3/2008 | Jones | G06Q 30/02 705/14.73 |
| 7,487,435 B2 * | 2/2009 | Aviv | 715/205 |
| 7,657,022 B2 * | 2/2010 | Anderson | 379/266.07 |
| 7,706,740 B2 * | 4/2010 | Collins et al. | 455/3.01 |
| 7,941,092 B2 * | 5/2011 | Rao | 455/3.04 |
| 8,073,013 B2 * | 12/2011 | Coleman et al. | 370/486 |
| 8,078,096 B2 * | 12/2011 | Rao | 455/3.04 |
| 8,131,270 B2 * | 3/2012 | Rao | 455/414.1 |
| 8,135,331 B2 * | 3/2012 | Rao | 455/2.01 |
| 8,175,511 B1 | 5/2012 | Sordo et al. | |
| 8,195,749 B2 * | 6/2012 | Rao | 709/206 |
| 8,249,920 B2 * | 8/2012 | Smith | 705/14.1 |
| 8,270,893 B2 * | 9/2012 | Rao | 455/2.01 |
| 8,285,196 B2 * | 10/2012 | Rao | 455/2.01 |
| 8,290,810 B2 * | 10/2012 | Ramer et al. | 705/7.32 |
| 2001/0056374 A1 * | 12/2001 | Joao | 705/14 |
| 2002/0046200 A1 | 4/2002 | Floven et al. | |
| 2002/0054089 A1 | 5/2002 | Nicholas et al. | |
| 2002/0059132 A1 | 5/2002 | Quay et al. | |
| 2002/0059373 A1 | 5/2002 | Boys | |
| 2002/0059621 A1 | 5/2002 | Thomas et al. | |
| 2002/0069161 A1 | 6/2002 | Eckert et al. | |
| 2002/0070961 A1 | 6/2002 | Xu et al. | |
| 2002/0071528 A1 | 6/2002 | Kumamoto | |
| 2002/0106617 A1 | 8/2002 | Hersh | |
| 2002/0107737 A1 | 8/2002 | Kaneko et al. | |
| 2002/0108109 A1 | 8/2002 | Harris et al. | |
| 2002/0116258 A1 | 8/2002 | Stamatelatos et al. | |
| 2002/0120593 A1 | 8/2002 | Iemoto et al. | |
| 2002/0123359 A1 | 9/2002 | Wei et al. | |
| 2002/0124247 A1 * | 9/2002 | Houghton | H04N 5/44543 725/9 |
| 2002/0128908 A1 * | 9/2002 | Levin et al. | 705/14 |
| 2002/0138334 A1 | 9/2002 | DeCotiis et al. | |
| 2002/0138392 A1 | 9/2002 | LeBlanc | |
| 2002/0138462 A1 | 9/2002 | Ricketts | |
| 2002/0143975 A1 | 10/2002 | Kimura et al. | |
| 2002/0155419 A1 | 10/2002 | Banerjee et al. | |
| 2002/0161708 A1 | 10/2002 | Offer | |
| 2002/0161833 A1 | 10/2002 | Niven et al. | |
| 2002/0165666 A1 | 11/2002 | Fuchs et al. | |
| 2002/0178223 A1 | 11/2002 | Bushkin | |
| 2002/0183059 A1 | 12/2002 | Noreen et al. | |
| 2002/0188746 A1 | 12/2002 | Drosset et al. | |
| 2002/0198769 A1 | 12/2002 | Ratcliff, III | |
| 2003/0003946 A1 | 1/2003 | Bocconi | |
| 2003/0009371 A1 | 1/2003 | Gauba et al. | |
| 2003/0014400 A1 | 1/2003 | Siegel | |
| 2003/0028871 A1 * | 2/2003 | Wang et al. | 725/9 |
| 2003/0036935 A1 | 2/2003 | Nel | |
| 2003/0037033 A1 | 2/2003 | Nyman et al. | |
| 2003/0037068 A1 | 2/2003 | Thomas et al. | |
| 2003/0046140 A1 | 3/2003 | Callahan et al. | |
| 2003/0050959 A1 | 3/2003 | Faybishenko et al. | |
| 2003/0060284 A1 | 3/2003 | Hamalainen et al. | |
| 2003/0110234 A1 | 6/2003 | Egli et al. | |
| 2003/0154242 A1 * | 8/2003 | Hayes et al. | 709/203 |
| 2003/0208756 A1 * | 11/2003 | Macrae et al. | 725/34 |
| 2004/0034561 A1 * | 2/2004 | Smith | 705/14 |
| 2004/0064833 A1 * | 4/2004 | Lee et al. | 725/42 |
| 2005/0193333 A1 * | 9/2005 | Ebert | 715/517 |
| 2006/0195441 A1 * | 8/2006 | Julia et al. | 707/5 |
| 2006/0262922 A1 * | 11/2006 | Margulies et al. | 379/265.12 |
| 2007/0130585 A1 * | 6/2007 | Perret et al. | 725/46 |
| 2008/0214162 A1 * | 9/2008 | Ramer | G06F 17/30749 455/414.2 |
| 2008/0227076 A1 | 9/2008 | Johnson | |
| 2012/0022905 A1 * | 1/2012 | Meyer et al. | 705/7.13 |
| 2012/0028230 A1 | 2/2012 | Devereux | |
| 2012/0284324 A1 * | 11/2012 | Jarville et al. | 709/203 |
| 2016/0110741 A1 | 4/2016 | Rao | |
| 2016/0110742 A1 | 4/2016 | Rao | |
| 2016/0110743 A1 | 4/2016 | Rao | |
| 2016/0110756 A1 | 4/2016 | Rao | |
| 2016/0117064 A1 | 4/2016 | Rao | |
| 2016/0117700 A1 | 4/2016 | Rao | |
| 2016/0117701 A1 | 4/2016 | Rao | |
| 2016/0117943 A1 | 4/2016 | Rao | |
| 2016/0119439 A1 | 4/2016 | Rao | |
| 2016/0119765 A1 | 4/2016 | Rao | |

OTHER PUBLICATIONS

U.S. Appl. No. 14/985,353, Aug. 19, 2016, Office Action.
U.S. Appl. No. 14/985,353, Nov. 16, 2016, Office Action.
U.S. Appl. No. 13/869,678, Apr. 8, 2016, Office Action.
U.S. Appl. No. 14/985,353, Apr. 1, 2016, Office Action.
Internal Revenue Service, Department of the Treasury, 1040 Instruction, 2004, entire document.
U.S. Appl. No. 14/985,355, Feb. 7, 2017, Office Action.
U.S. Appl. No. 13/869,678, May 18, 2017, Office Action.
U.S. Appl. No. 14/985,353, Apr. 14, 2017, Office Action.
U.S. Appl. No. 14/985,355, Jul. 12, 2017, Office Action.

\* cited by examiner

SYSTEM FOR PROVIDING INTERACTIVE USER INTEREST SURVEY TO USERS OF MOBILE DEVICES

CROSS REFERENCES TO RELATED APPLICATIONS

This patent application makes reference to, is based on, and is a continuation of U.S. non-provisional patent, Ser. No. 11/821,771, entitled "System for providing interactive user interactive user interest survey to user of mobile devices", filed on Jun. 25, 2007. The complete subject matter of the above-referenced United States patent application is hereby incorporated herein by reference, in its entirety.

This patent application makes reference to U.S. provisional patent Ser. No. 60/860,700, entitled "AUDIO GUIDED SYSTEM FOR PROVIDING GUIDANCE TO USER OF MOBILE DEVICE ON MULTI-STEP ACTIVITIES", filed on Nov. 22, 2006. The complete subject matter of the above-referenced United States patent application is hereby incorporated herein by reference, in its entirety.

This patent application makes reference to U.S. Provisional Patent Application Ser. No. 60/524,568, entitled "QUESTIONNAIRE NETWORK FOR MOBILE HANDSETS," filed on Nov. 24, 2003. The complete subject matter of the above-referenced United States Provisional patent application is hereby incorporated herein by reference, in its entirety.

This patent application makes reference to U.S. patent application Ser. No. 10/985,702, entitled "QUESTIONNAIRE NETWORK FOR MOBILE HANDSETS," filed on Nov. 10, 2004. The complete subject matter of the above-referenced United States patent application is hereby incorporated herein by reference, in its entirety.

This patent application makes reference to U.S. Provisional Patent Application Ser. No. 60/530,175, entitled "QUESTIONNAIRE NETWORK FOR MOBILE HANDSETS AND A TRADING SYSTEM FOR CONTRACTS ON USER COMMITMENTS TO ANSWER QUESTIONNAIRES," filed on Dec. 17, 2003. The complete subject matter of the above-referenced United States Provisional patent application is hereby incorporated herein by reference, in its entirety.

BACKGROUND

1. Technical Field

The present invention relates generally to the interactions between mobile handset and it's a server within a network, and more specifically to the ability to create surveys, store them in a network, disseminate them and collect results.

2. Related Art

Electronic devices, such as mobile phones and personal digital assistants (PDA's), often contain small screens with very limited viewing area. They are constrained in terms of how much information can be displayed, and in terms of user interaction capabilities. The keyboards on cell phones, for example, are not conducive for user data entry, and only brief user inputs can be solicited from a user without annoying the user.

Often a user would want to seek online help using a mobile phone for conducting an activity such as fixing a problem with a car (changing tires for example) or baking a cake, without having to use a bulky notebook computer that might get damaged due to various constraints and problems of a work area. The use of a computer/notebook is not always possible to retrieve help information when they are needed, such as during an accident on the highway or while cooking in a kitchen that has limited space. The use of a mobile phone is preferable in such circumstances but mobile phones, in general, are not endowed with the features or applications necessary to facilitate easy access to such information in a format that is useable and convenient. The whole process of retrieving necessary information using a mobile phone is inconvenient due to the inability of the Internet websites to provide information that a typical user can easily read, browse through or view on his mobile phone.

Information access from typical Internet based websites using mobile devices are quite often unsatisfactory and not useful due to several factors, not least of which is the multi-media and graphics rich format in which most Internet websites are designed. In addition, Internet websites tend to be and made available with a lot of graphics and prone towards needless verbosity of text. A mobile phone with a small screen is not a good candidate for viewing such complicated and graphics rich (with graphics, flash screens, video components, etc.) content—imagine a webpage being presented to a user that has a music component, a whole a page of text (over 3 KB of text) and three large diagrams, and a table of information, all on the same webpage. Such a multi-media webpage is very typical, and is obviously unsuitable for access using a mobile device, such as a small cell phone.

User interaction in real time, such as those provided for a user using a PC on the Internet, are often not possible for a user using a cell phone. For example, the amount of textual information presented to a user cannot be a full page of textual information that is typically made available on a PC. Graphical information also cannot be large and too many graphical images should not be on the same webpage. A typical website provides a rich multi-media experience that has several graphical images, large amounts of text, tables, etc. The same website, when accessed from a cell phone, would not only be unreadable, due to its large amount of text, graphics and even video, but also frustrating due to the nature of web sites—the design of websites often being multi-media based (predominantly providing large multi-media web pages full of text, graphics, flash-based and even containing videos). Often webpages on the Internet provide detailed information to a user while soliciting inputs from a user. Thus, there is a problem in presenting a mobile user with information in order to solicit user input when the user is using a cell phone. Soliciting user input from a user when the user is using a cell phone, rather than a PC, is a big problem.

Mobile devices such as a cell phone are therefore devices for which traditional websites are ill prepared to provide information. In addition, surveys or questionnaires that are created for Internet based access via a PC are not appropriate for cell phone access. Asking one or more detailed questions with information on how to answer them is possible on a web page that is accessed from a PC. However, the same web page would be unsuitable, unmanageable and difficult to browse and navigate on a cell phone with a small LCD screen and small keyboard for user input.

There is often a need to present a user with a list of items and be able to determine which of those items interest the user. For example, the list of items could be a list of camcorders or a list of houses for sale. There are no easy ways to do this if the user is using a mobile device. In fact, if an MMS email is sent to the user with all the items (each item may include graphics, text, etc.), the user has to in the first place, subscribe to the expensive MMS service. Secondly, he has to be able to receive MMS service on his device. Thirdly, after receiving an email with all those items, the user has to browse them, and send an email back from the device to show which items he is interested in. The email response would require the user to include the entire MMS message (or significant portions thereof) with his comments incorporated in order to provide the context for the response showing selective interest. This inclusion of received multimedia text would make the email response quite large (unnecessarily large). On the other hand, if the user were to not include significant portions of the received mail in his response, his responses may be read out of context or be associated with the wrong context. Thus, information solicited from a user via a email response is cumbersome, despite being expensive and email response from mobile being a painful experience, and inadequate.

Surveys cannot currently be sent to mobile devices easily, as responding to surveys on a mobile device is not easy due to the large amounts of text accompanying each question and the limitations of a small screen that are not appropriate to review large amounts of text. Also, most surveys require some text entry, something very inconvenient for most people who use mobile phones.

Further limitations and disadvantages of conventional and traditional approaches will become apparent to one of ordinary skill in the art through comparison of such systems with the present invention as set forth in the remainder of the present application with reference to the drawings.

BRIEF SUMMARY OF THE INVENTION

The present invention is directed to apparatus and methods of operation that are further described in the following Brief Description of the Drawings, the Detailed Description of the Invention, and the claims. Other features and advantages of the present invention will become apparent from the following detailed description of the invention made with reference to the accompanying drawings.

DETAILED DESCRIPTION OF THE DRAWINGS

Figure 1:
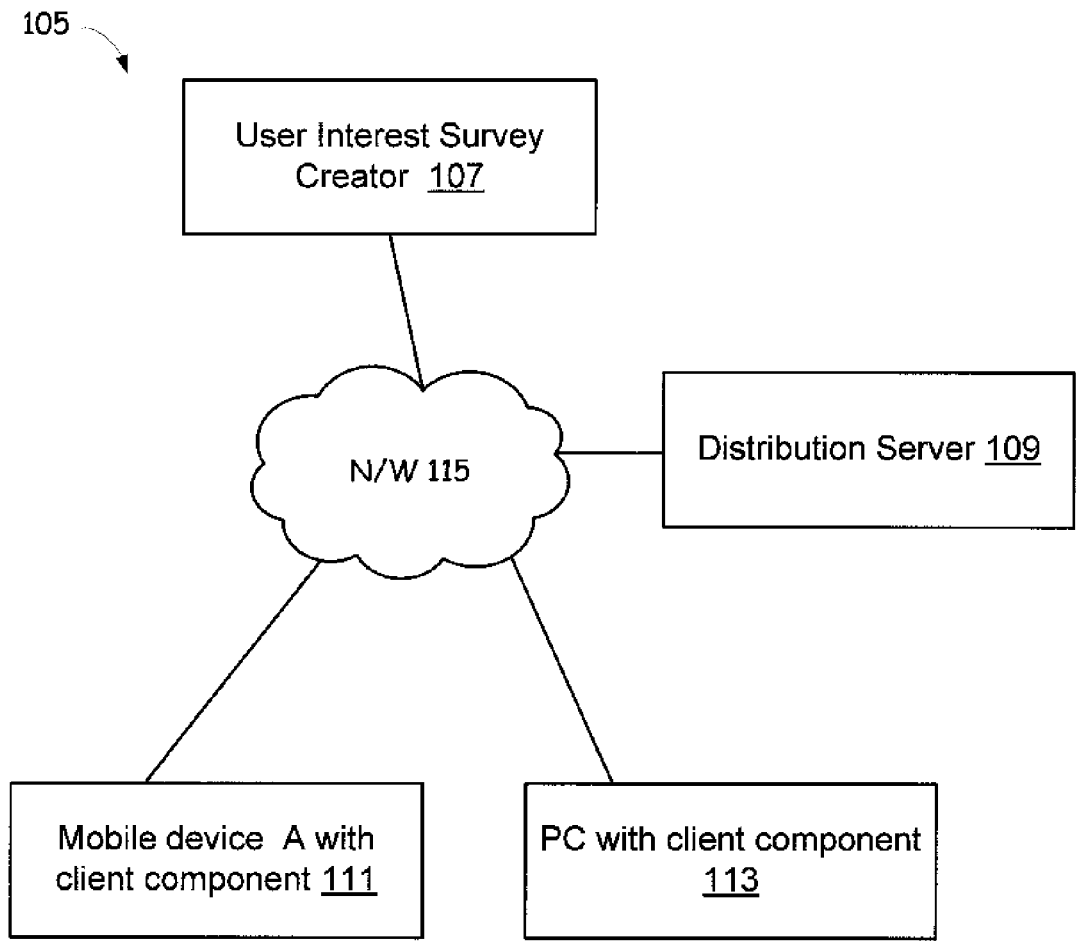
FIG. 1 is a perspective block diagram of a network that supports creation and dissemination of user interest surveys to mobile devices and the subsequent collection of interest information from the mobile devices.

FIG. 1 is a perspective block diagram of a network 105 that supports creation and dissemination of user interest surveys to mobile devices and the subsequent collection of interest information from the mobile devices. The network 105 facilitates the creation and dissemination of user interest surveys to a plurality of other recipient devices 111, 113, wherein the user interest surveys are disseminated to the recipient devices 111, 113 in a form that is compatible with the capabilities of the respective recipient devices 111, 113, and wherein the preferences of the user are also factored in. The network 105 comprises the user interest survey creator 107, the plurality of recipient devices 111, 113 and a distribution server 109. Some of the plurality of recipient devices are mobile devices 111 while others are PCs/computers 113.

The display of user interest survey in a recipient mobile device 111, such as the recipient mobile device A 111, requires the use of a corresponding client component, such as a QClient, that can display/render user interest surveys, one at a time. In general, the Qclient is capable of playing audio-assisted interactive media on the mobile device or a PC where it is installed.

In accordance with the present invention, an audio assisted user interest survey 107 creator facilitates creation of an interactive user interest survey which solicits user input indicating user interest in one or more items presented. The items can be products for sale or services rendered, that a user might want to review and optionally indicate interest in, or indicate preference for. An user interest survey thus created is disseminated to one or more recipient mobile devices over the network 115 employing the services of a distribution server 109. The user interest information is also collected by the distribution server 109 and reported back to the user interest survey creator 107 or to alternate servers/computers. The user interest survey is targeted to devices that are either identified by the user interest survey 107 or by the distribution server 109.

The distribution server 109 receives user interest survey from interactive media creator, such as the user interest survey creator 107. It selectively adds boilerplate text, graphics, music etc. as needed, and forwards it to specified recipient mobile devices. In one embodiment, it multicasts it to users who have subscribed to it (or it broadcasts it to all users).

User interest in one or more items presented in a user interest survey that is captured in mobile device 111 or in the PC with client component 113, are sent to the distribution server 109, and subsequently from the distribution server 109 to a repository for storage or processing. It is also reported back to an interested party or entity.

Mobile users receive the user interest surveys on their mobile devices 111 and respond back to it. For example, they can show their user interest in one or more items presented, which is captured by the distribution server 109. Thus, user interest captured from the mobile devices 111 (from users of the mobile devices) is sent by the distribution server to a repository or reported back to the user interest survey creator 107, another server/computer, to the email address of an interested party or entity, etc.

Users on PC, such as users on the PC with client component 113, can receive user interest surveys on their PCs 113 and respond to them. The PC with client component gets opportunity to download & install a client before accessing the user interest survey. It can also receive subset of the interactive media that it can handle without using the client component, such as by using a browser.

Typically, recipient mobile devices 111 comprise a client component used to receive and display interactive media, such as user interest surveys. The client component lets the user read it, browse through it, and provide inputs/selections. The user can, for example, click on a check box for each of the items shown, to show interest in the associated product/service/item. In a related embodiment, the user can, for example, click on a check box for each of the items shown, to show disinterest in the associated product/service/item.

In one embodiment, a recipient mobile device 111 that may not have a client component, gets an opportunity to download and install the client component. It can also receive a subset of the user interest survey that it can handle without using the client component, such as by using a browser.

Each interactive user interest survey comprises several components, such as graphics, video content, textual content, and/or audio content. These components may be adapted to the device to make them more appropriate for the recipient devices. For example, graphics may be made more compatible (smaller or compact) to a device if a mobile device is not capable of displaying a default size (albeit small) presented by a interactive user interest survey creator 107.

The interactive user interest survey creator 107 that is communicatively coupled to the distribution server 109 via network 115 makes it possible for a user, such as a designer of a product advertisement, to incorporate text, audio, voice, music, video, graphics etc. into the interactive user interest survey. For example, each interactive user interest survey is similar to an audio guided activity (AGA) that comprises textual descriptions, audio preambles, optional audio supplementary information, an optional textual supplementary information, for each step of a multi-step audio guided activity. In addition, it comprises a selectable checkbox (sometimes more than one checkbox) that can be optionally be set by a user to indicate interest (or sometimes, the lack thereof).

In one embodiment, an interactive user interest survey is used to provide a user with multiple items for review and response. For example, a list of products up for sale by a merchant or store can be provided and user interest solicited on those products. The display of each item (product, service, item for sale, etc.) in a mobile device 111 involves the display of textual descriptions, the playing of audio information such as a preamble, the optional display of supplementary information and the playing of audio supplementary information, if available. In also involves soliciting user interest—the user can optionally select a radio button provided to solicit user interest.

An interactive media that is a list of items being advertised may comprise at least one of a graphic, music component, textual component and a video component, for each item of the list of items. In addition, simple user inputs such as a start, stop, pause, advance, cancel, replay, etc. are also provided. For example, a simple advertisement may have just some text and a small graphic, with some background music that plays for 10 seconds, with user interaction supported for retrieving additional information, terminating the display of a current product being advertised, and for advancing to the next product advertisement.

Some of the plurality of recipient devices 111, 113 can be legacy devices that do not have a necessary client component capable of handling the download and display of interactive media. Others of the plurality of other recipient devices 111, 113 have the client component capable of handling the download and display of the interactive user interest surveys.

In one embodiment, the mobile device 111 is one of a set of devices comprising cellular phones, PDAs, etc. The network 115 is one of a wireless and/or wired network, cellular network such as 3G, UMTS, CMDA, GSM, etc., a WLAN network, or a WiMAX network, Internet, Bluetooth, IrDA, etc.

In one embodiment, the list of available interactive user interest surveys are provided to the user by a distribution server 109 and a user can, on his recipient device 111, 113, select which of those surveys he would like to respond to. Such a list is provided based on user preferences and user profile by the distribution server 109. A user can subscribe to one or more categories of user interest surveys too, or to one or more sources of user interest surveys (sources being content development companies, etc.) and the distribution server 109 stores that information as part of the user's preferences and selects user interest surveys for delivery to the mobile device 111, or to the PC 113 based on that. In a related embodiment, such a list is provided based on a priority of user interest surveys determined by the distribution server 109. In a different embodiment, the user's selections of various subscriptions of user interest surveys is managed by the distribution server 109 which provides an RSS feed of the selected user interest surveys to the user on his mobile device 111 and the PC 113.

In one embodiment, the client in the mobile device 111 and the PC 113 is capable of inserting user interest solicitation text into the multiple items of a received survey. The client in the mobile device inserts user interest solicitation in the form of boilerplate multiple choice selections into the multiple items of the survey. The user can select one or more of the multiple choice selections (based on the type of multiple choice selections provided). The client then collects user's indication of interest to the multiple items and communicates it to the server. In a related embodiment, the server inserts boilerplate multiple choice selections into the items of the survey and sends the modified survey to the mobile device 111 and the PC with client 113.

In one embodiment, the user's response to the user interest solicitation is by means of an audio feedback provided by a user that is captured by the client in the mobile device 111 or the PC with client 113. The user's response captured in audio form is communicated to the distribution server 109 or to other servers that may be designated as the receiver of responses from the client.

The multiple items of the user interest survey created by the user interest survey creator 107 each further comprise supplementary information. The supplementary information comprises at least one of supplementary audio information, a supplementary text information and additional figures.

In general, some of the items in an user interest survey may comprise of a user interest solicitation while others do not. Not all items in an user interest survey need to solicit user's response to that corresponding item. The associated user interest solicitation typically comprises a multiple choice selection that facilitates in the user providing the user's response. For example, the multiple choice selections can be "Yes, I am interested." and "No, I am not interested". The user can select one of them in a mutually exclusive mode. Other forms of multiple choice selections, such as those where a user can select multiple entries, are also contemplated. In general, the user's response comprises a selection of at least one entry of the multiple choice selection. In one embodiment, the user can provide an audio user's response, by recording a response and providing audio inputs. Such audio inputs can be in addition to the corresponding multiple choice selections. In a related embodiment, the audio inputs are provided by a user in lieu of the multiple choice selections.

In one embodiment, the client component in the recipient devices 111, 113 facilitates recording of a user's survey feedback to the user interest survey. Thus, at the end of the survey, for example, the user can record a survey feedback, that applies to the entire survey. This can be provided using an audio input that is recorded, or by entering text inputs. Such feedback for the survey is in addition to the responses to the individual items in the survey, that are collated into a user interest feedback. Thus, the user interest feedback (which is a collation of user's responses to individual items in the survey, such user's responses comprising optional audio response and optional multiple choice selections) and the user's survey feedback are both communicated to the distribution server 109 or to alternate servers specified or configured.

The client component in the recipients 111, 113 can handle surveys that do not comprise multiple choices for the items and instead, comprise a type for each item. Thus, each of the multiple items of the survey comprise a type and the client component, based on the type, inserts an appropriate associated user interest solicitation into each of the multiple items of the survey as it is displayed. Thus, based on the type, different items in the survey can be provided their own multiple choice selections that is different form those provided to the others. The client component gathers the user's responses to those multiple choice selections and communicates it to the distribution server 109 or to alternate servers specified or configured.

In general, the distribution server 109 communicates the audio-assisted survey received from the user interest survey creator 107 to a plurality of recipient devices 111, 113, such a plurality of recipient devices being identified in a list of recipients either preconfigured or provided by the user interest survey creator 107 along with a survey. The server receives user interest feedback from each of the plurality of recipient devices and collates them into a report. The server subsequently sends the report to the distribution server 109 or to an alternate destination/server identified or configured.

Figure 2:
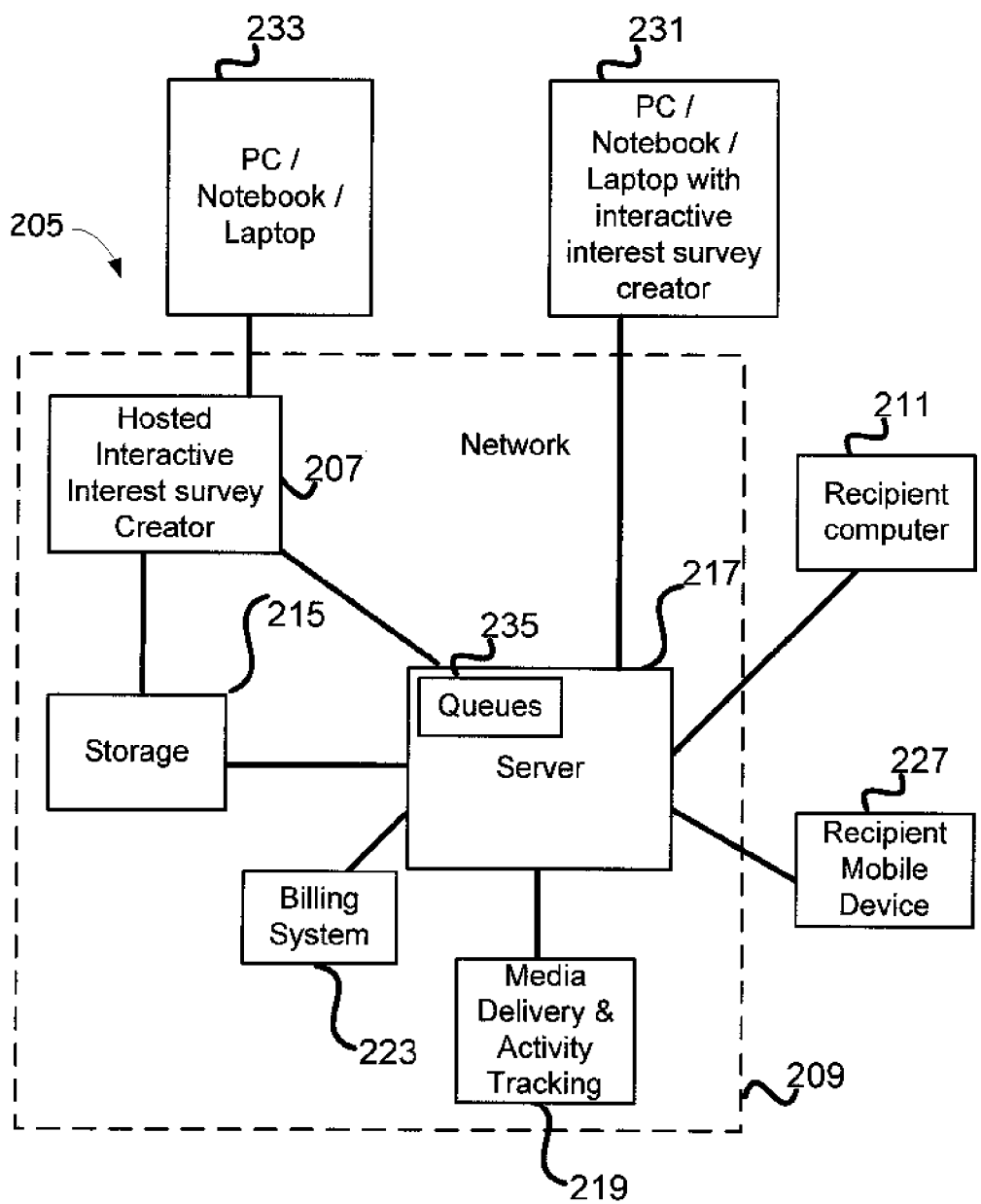
FIG. 2 is a perspective block diagram of a system that supports creation and distribution of audio-assisted user interest surveys.

FIG. 2 is a perspective block diagram of a system 205 that supports creation and distribution of audio-assisted user interest surveys. Audio assisted user interest survey can be created in a hosted server 207 or on notebook/PC 231 that comprises an user interest survey creator tool. An user, employing an interactive interest survey creation tool in a notebook/PC 231, creates an interactive interest survey content for dissemination, and then sends it to a server with a list of recipients/mail-list. A user can also employ a PC communicatively coupled to a hosted interactive interest survey creation tool 207 to create an interactive user interest survey content with audio inputs, graphics and textual inputs appropriate for a mobile device. The user also provides a recipient list for the interactive user interest survey that a server 217 uses to communicate it to one or more recipients. The server 217 sends out the interactive interest survey to recipients, using their mobile phone numbers, IP addresses, email addresses, etc. User interest information provided by users in response to the user interest survey is collated by the server 217 and provided to sender.

The creation and dissemination of user interest surveys is facilitated by a PC/computer 231, and by a hosted interactive media creator 207 that is accessed by the user using a PC/notebook/laptop 233. The system 205 comprises the PC/computer 231 that a user uses to create interactive media, a server 217 that receives the interactive media and sends them to one or more recipient mobile devices 227 and recipient computer 211, and the hosted interactive media creator 207 that facilitates interactive media creation using the PC/laptop/computer 233, or via web pages provided by the server 217.

The audio assisted user interest survey creation is also facilitated by a hosted creation tool 207 that is communicatively coupled to the server 217.

The network 209 also comprises a storage 215 that is used to store interactive media, user profiles, required user profiles desired by individuals or companies interested in disseminating interactive media. It also comprises a media delivery & tracking component 219 that stores results and activity logs that can be used to track interactive media creation, dissemination, and other related activities. In addition, the network 209 comprises a billing system 223 that can facilitate billing for the creation of user interest surveys, the distribution of user interest surveys, the charges or payments made to recipients of interactive media for participating in the user interest surveys, the charges made to individuals and companies when a recipient views delivered user interest surveys, etc.

The server 217 comprises a plurality of queues 235 for each user, wherein each of the plurality of queues holds a different category of interactive media for a recipient, or references to interactive media of a specific type of category that a user is likely to be interested in. For example, user interest surveys will be supported by a queue for that category. In another related embodiment, the server 235 maintains several queues 235 of interactive media, some of the queues dedicated to specific categories of interactive media, to specific companies creating the interactive media, or to user groups. Other types of queues are also contemplated.

When a recipient using the recipient mobile device 227 gets the user interest survey on his mobile device, the segments of the user interest survey themselves are provided to the recipient by the server 217, starting with the first segment of a multi-segment user interest survey. Thus, in the beginning of the user interest survey, the recipient would view the first item, perhaps with an audio preamble and appropriate textual description, and would be able activate an Info menu item to hear the audio preamble for the first item. The user advances to the next item by activating the Next menu item to proceed, etc. Alternatively, all items are provided at once to the recipient mobile device 227 wherein the interactive media client component manages its local display/rendering, one item at a time.

In one embodiment, an XML based user interest survey is created/stored/by a user using a PC/notebook/laptop 231. It is created as an XML file comprising multiple items—wherein each item comprises:

an audio preamble,
graphics
a textual step description, and
an audio supplementary information.
One or more user interest related radio buttons The audio preamble and audio supplementary information are played/rendered during a display of a segment, when invoked by the user using appropriate menu-items or buttons. The textual segment description comprises Textual description in the form of a small paragraph. Optionally, it also comprises a graphics or a picture that is also provided as part of the XML based interactive media. The user interest related radio buttons can be selected by a user—these buttons can be mutually exclusive or allow for multiple selections.

Figure 3A:
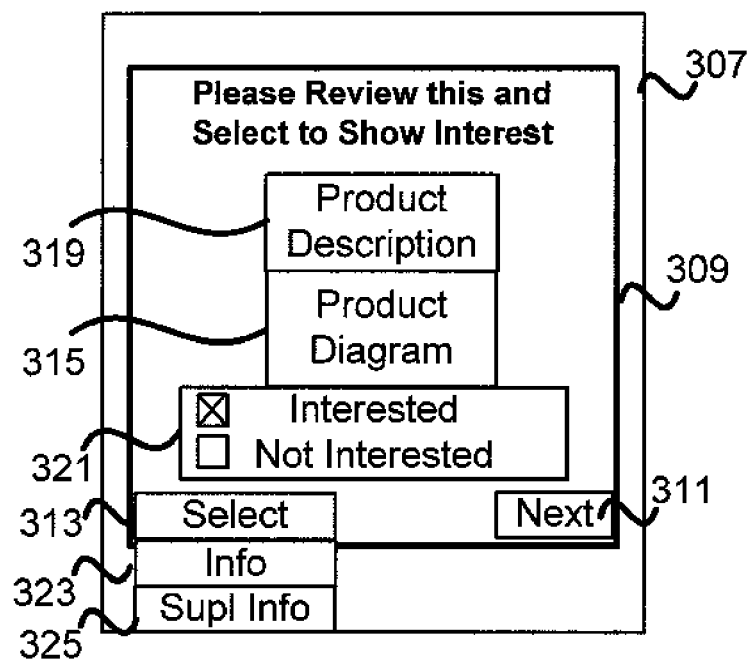
FIG. 3A is an exemplary display screen on a mobile device that supports the display of a user interest survey using an user interest survey client component in the mobile device.

FIG. 3A is an exemplary display screen 309 on a mobile device 307 that supports the display of a user interest survey using an user interest survey client component in the mobile device 307. A similar screen is also provided while the user browses through an user interest survey on the mobile device 307 using a browser. The mobile device 307 receives notifications, such as those received as an SMS message sent to the user (for example, message of type Service message). The notification offers the user an opportunity to download a client component that is capable of displaying an user interest survey.

The exemplary display screen 309 provides a product description 319 and a product diagram/image 315 to the user, and the user can select (using the select menu item of soft key) one of the available multiple choice radio buttons 321 to show interest, or lack thereof, in the product. For example, the user can select the radio box "Interested" using the "Select" soft key 313. The user can proceed to the next item by activating the Next soft key 311. Typically, the product description 319 is a brief textual description with accompanying audio product descriptions that can be played by selecting the Info soft key 323 (sometimes provided as a button). The product diagram 315 is an image, such as a JPEG image or a PNG image that is provided as part of an XML document for the user interest survey (or retrieved from a link provided to it in the XML document).

A list of user interest survey screens, each screen displaying information on one product, services or item of possible interest to a user, is presented to the user in a typical XML based user interest survey. The user thus has an option to show interest level by selection on of the available choices 321 (radio buttons) using the soft keys 313 for each of the products, services or item presented. For example, the user can review a product such as a TV in a screen that provides product description, a product diagram, pricing information, etc. And select one of an "Interested" or "Not Interested" soft keys/buttons to show interest level, that is communicated to a server. The user can use the Next button 311 to advance to the next product/item. The user can request additional information by selecting Supl Info 325 in soft keys 313/selection list (drop down list).

Each item in an user interest survey can have its own set of available choices 321 (radio buttons) that can be selected using the soft keys 313. Some items may have mutually exclusive set of available choices, while others can allow multiple choice selections.

Figure 3B:
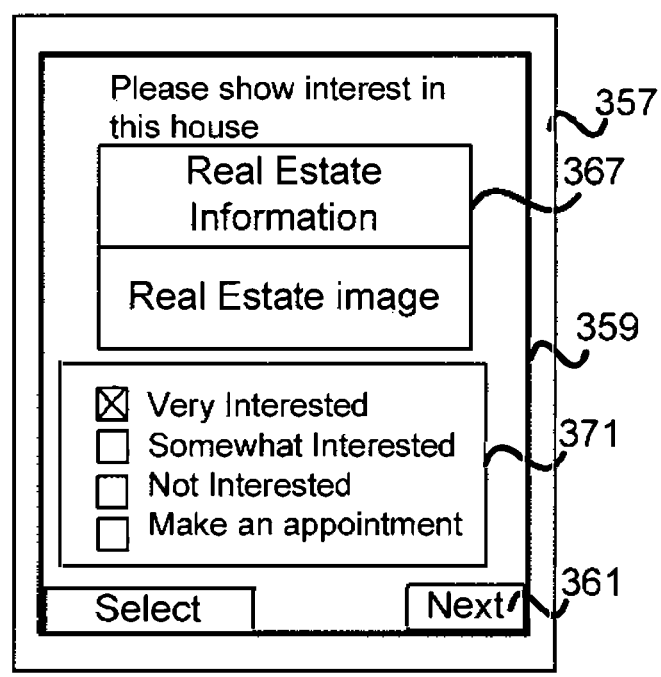
FIG. 3B is an exemplary screen of an interactive user interest survey client component on a mobile device wherein a real estate information is displayed, to which a user can show his level of interest by selecting one of the available choices displayed.

FIG. 3B is an exemplary screen of an interactive user interest survey client component 359 on a mobile device 357 wherein a real estate information 367 is displayed, to which a user can show his level of interest by selecting one of the available choices 371 displayed. For example, the user can select the "Very Interested" choice from the available choices 371, for the real estate information 367, thereby providing the sender with an opportunity to subsequently follow-up with the user with the associated house leading to a potential sale. In general, the audio assisted user interest survey presented by the user interest survey client component 359 on the mobile device 357 provides product/service/item of potential interest to user, with a list of radio buttons for user to select from, to show interest level. The radio buttons can be mutually exclusive or multiple selection.

Using a Next button 361 on the screen 359, a user can advance to the next real estate item on the current user interest survey. The screen of the client component 359 can display user interest items from different categories of items too, within the same user interest survey, if necessary.

Figure 3C:
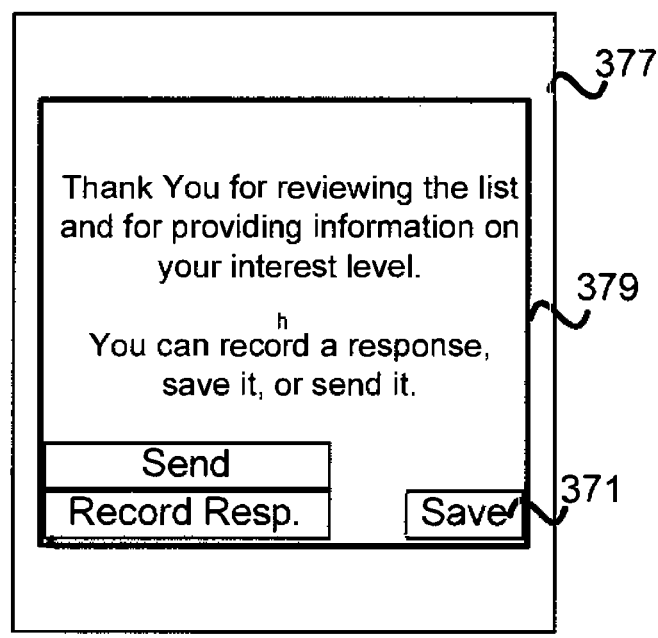
FIG. 3C is an exemplary screen/window presented by a interest survey client component on a mobile device, that is used by a user to provide response/feedback in audio form to a sender at the end of the presentation of a list of items.

FIG. 3C is an exemplary screen/window 379 presented by a interest survey client component on a mobile device 377, that is used by a user to provide response/feedback in audio form to a sender at the end of the presentation of a list of items. An user interest survey is presented by the interest survey client component, at the end of which, the user can provide a response or feedback in audio form, such as by recording a voice message. The user's audio response/feedback, along with user's interest indication for each item presented in the user interest survey, are communicated by the mobile device to a server, that can subsequently be retrieved by a sender (using a web interface to the server, for example).

Thus, typically, at the end of list of products/items/etc. that is provided in the user interest survey, which is reviewed by user, the user is provided an opportunity to record a response that is sent to a sender. The user can save his selections for later review or send it to the server for processing, and subsequent forwarding to a associated sender.

Figure 4:
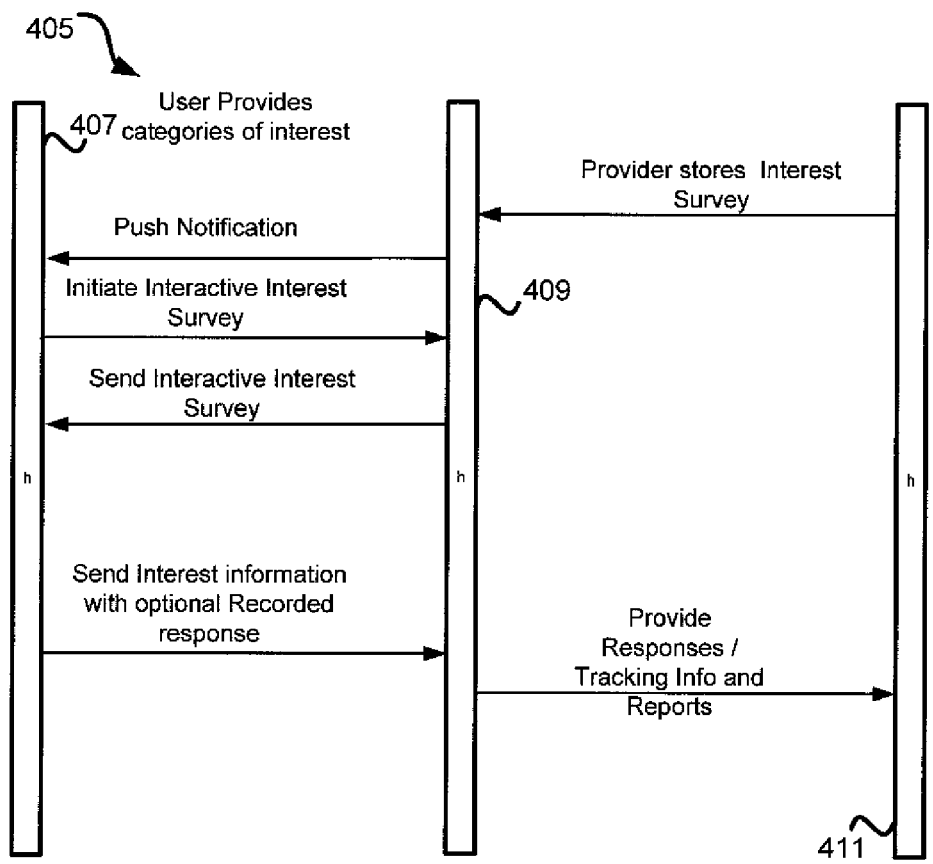
FIG. 4 is an interaction diagram that depicts an exemplary interaction between a recipient device, used to respond to an user interest survey, and a distribution server, wherein the recipient device (a mobile device, a PC, notebook, PDA or laptop) is used by a user to access/retrieve an user interest survey from one or more distribution servers.

FIG. 4 is an interaction diagram 405 that depicts an exemplary interaction between a recipient device 407, used to respond to an user interest survey, and a distribution server 409, wherein the recipient device 407 (a mobile device, a PC, notebook, PDA or laptop) is used by a user to access/retrieve an user interest survey from one or more distribution servers 409. The recipient device 407 provides user preferences, such as categories of user interest surveys or products and services of interest to the user, to the distribution server 409, based upon which the distribution server 409 sends push notification to the recipient device 407, After receiving the push notification, a user can initiate access to (one or more) user interest surveys. The distribution server 409 sends one or more user interest surveys to the recipient device 407 for review/response by the user. Additional info related to/associated with the user interest surveys, such as details of products and services associated with a particular user interest survey, may be requested by a user and the distribution server 409 sends them to the recipient device 407 for review by the user. The user interest survey is typically created using an interactive user interest survey creation tool 411 that is communicatively coupled to the distribution server 409, Towards the end of the user interest survey, the user is provided the option to record a personal message, that can comprise a request for additional information and/or provide some feedback. The interactive user interest survey creation tool 411, or another external server, such as a billing server, can be the recipient of tracking information and reports sent by the distribution server 409 that presents information on users targeted, responses received, follow-up action to be taken, etc.

Figure 5:
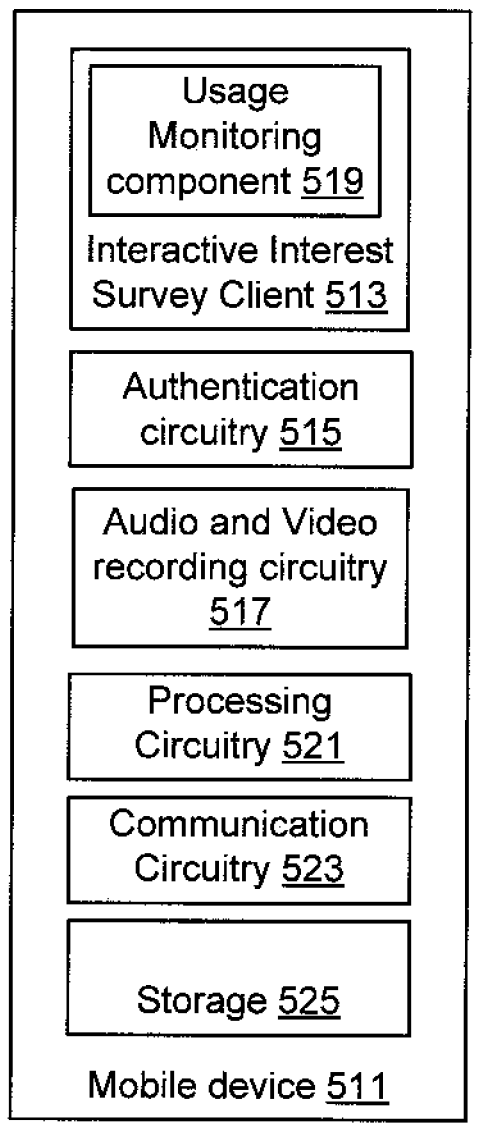
FIG. 5 is a perspective block diagram of a mobile device capable of receiving and playing/rendering user interest surveys and monitoring its usage.

FIG. 5 is a perspective block diagram of a mobile device 511 capable of receiving and playing/rendering user interest surveys and monitoring its usage. The mobile device 511 comprises an interactive user interest survey client 513 that in turn comprises an usage monitoring component 519. The mobile device 511 also comprises an authentication circuitry 515, an audio and video playback circuitry 517, processing circuitry 521, communication circuitry 523 and an storage 525.

Figure 6:
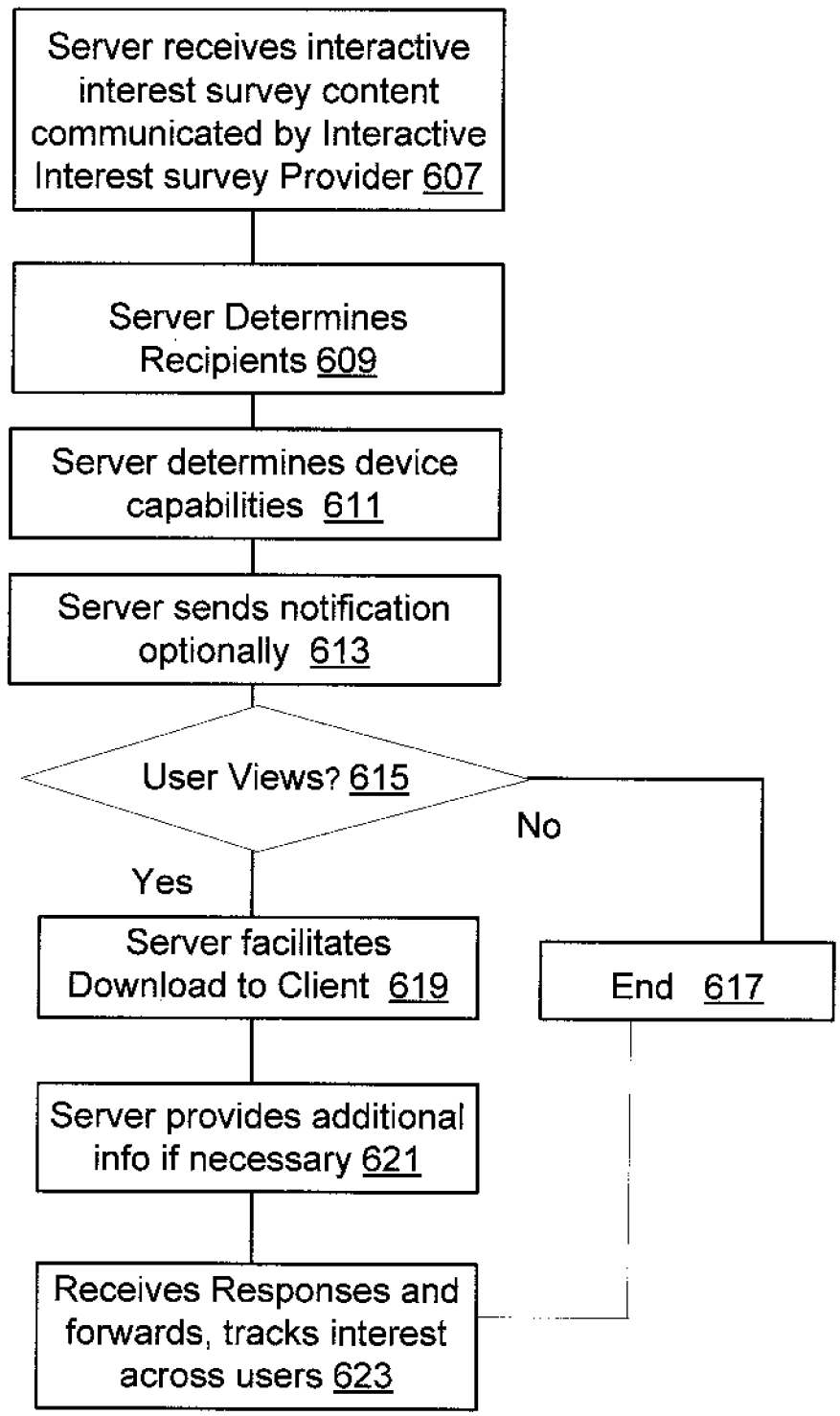
FIG. 6 is a flow chart of the operation of a distribution server as it receives interactive media from a provider and communicates it eventually to users of mobile devices.

FIG. 6 is a flow chart of the operation of a distribution server as it receives interactive media from a provider and communicates it eventually to users of mobile devices. At a start block 607, the operation starts when the server receives user interest surveys from a provider of user interest surveys. At a next block 609, the server determines who the recipients should be for the user interest surveys, based on user preferences available and metadata of the user interest surveys delivered by the provider. For example, a user may have indicated preferences for real estate information, laptop software and music in a preferences settings that is registered with a distribution server. In addition, the metadata comprises a category identification, a target profile describing a likely profile of recipients expected to be interested in the user interest surveys, security information such as credentials of the provider and authentication information, a digital signature of the user interest surveys for integrity check, etc.

Then, at a next block 611, the server adds the received and authenticated (and integrity checked) user interest surveys (or reference thereto) to queue of users 611 who are determined to be targets for delivery. Then, at a next bloc 613, the server sends a notification to the user's mobile device to notify the user of the availability of the user interest surveys in the queue. In one embodiment, the server creates a list of references to the user interest surveys that is available, and sends it to the mobile device to be shown in a queue/list (or more than one queue/list) from which the user can select.

Then, at a next decision block 615, the user selectively decides to view the user interest surveys, and either selects it for viewing or terminates viewing. In one embodiment, the user of the recipient mobile device browses through the list of available user interest surveys and selects one of them for viewing. If the user decides to view one of the items listed, the control passes to a next block 619, otherwise, processing terminates at a next block 617.

If, at the decision block 615, the user on the mobile device decides to view an user interest surveys (either from a list presented, from a notification received for inte user interest surveys or otherwise), at a next block 619, the user interest surveys client component downloads the user interest surveys. Then at a next block 621, the interactive user interest surveys is displayed to enable viewing by the user and the server provides additional information if necessary. The user interest survey client component monitors usage by the user. Finally, at the next block 623, the server receives responses back from the mobile device that it collects and forwards. The responses can be a combination of user interest indicated in particular items presented and an optional audio message/response from the user. The viewing of the user interest surveys by the user is reported to the server by the client, and optionally to a billing server or external server (such as one associated with the provider) by the server. Then, control optionally loops back to the decision block 615 where the user is provided an opportunity to view additional user interest surveys that may be available.

Figure 7:
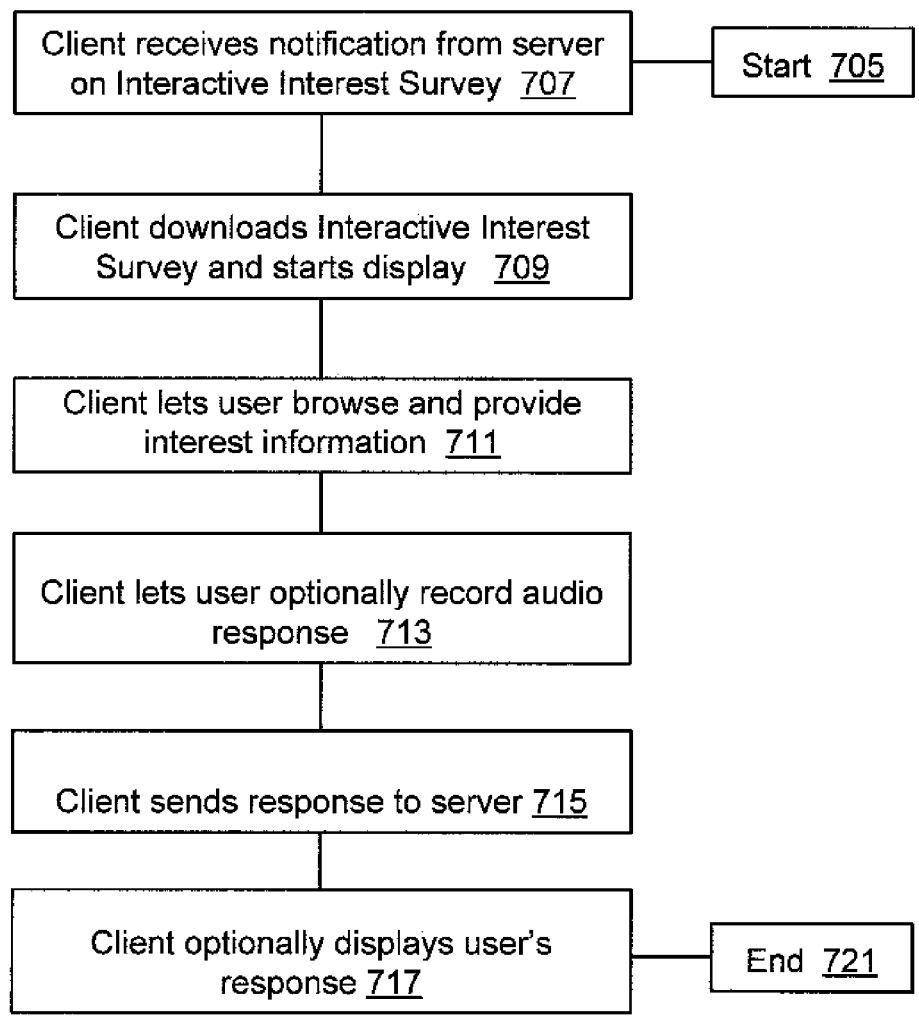
FIG. 7 is a flow chart of an exemplary operation of the user interest survey client that is capable of displaying user interest surveys on a mobile device/laptop.

FIG. 7 is a flow chart of an exemplary operation of the user interest survey client that is capable of displaying user interest surveys on a mobile device/laptop. Processing starts at a start block 705. Then, at a next block 707, the client receives notification of the availability of user interest surveys. Then, at a next block 709, the client downloads one or more user interest surveys. Then at a next block 711, the client lets a user browse through the items of the user interest survey and provide responses/interest information.

At a next block 713, the client facilitates recording of an audio response by the user. Such an audio response can comprise of a request for an additional information on individual items that interest the user, feedback on items that the user has shown interest in, follow-up action requested by a user, such as setting up an appointment for viewing the item or test the item (or viewing a house if the item is a real-estate for sale), etc. Then, at a next block 715, the user interest survey client communicates user's responses and interest information provided by user to the server. Then, at a next block 717, the user interest survey client optionally displays the user's user interest selections on the mobile device. Finally, processing terminates at the next end block 721.

As one of ordinary skill in the art will appreciate, the terms "user interest survey" and "survey," as may be used herein, comprises polls, product surveys, and other forms of inquiries that are typically used by enterprises to gauge the interest of their potential customers on products and services they sell/provide. In particular, it comprises such forms of inquiry where a user is required to or requested to provide feedback comprising their levels of interest in the various products or services brought to their attention.

As one of ordinary skill in the art will appreciate, the terms "operably coupled" and "communicatively coupled," as may be used herein, include direct coupling and indirect coupling via another component, element, circuit, or module where, for indirect coupling, the intervening component, element, circuit, or module does not modify the information of a signal but may adjust its current level, voltage level, and/or power level. As one of ordinary skill in the art will also appreciate, inferred coupling (i.e., where one element is coupled to another element by inference) includes direct and indirect coupling between two elements in the same manner as "operably coupled" and "communicatively coupled."

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention.

One of average skill in the art will also recognize that the functional building blocks, and other illustrative blocks, modules and components herein, can be implemented as illustrated or by discrete components, application specific integrated circuits, processors executing appropriate software and the like or any combination thereof.

Moreover, although described in detail for purposes of clarity and understanding by way of the aforementioned embodiments, the present invention is not limited to such embodiments. It will be obvious to one of average skill in the art that various changes and modifications may be practiced within the spirit and scope of the invention, as limited only by the scope of the appended claims.

What is claimed is:

1. A system comprising:
at least one processor; and
at least one non-transitory computer readable storage medium storing instructions thereon that, when executed by the at least one processor, cause the system to:
receive, at a distribution server and from a remote computer device, a content item for presentation within a user interest survey, wherein the content item is identified by a sender entity corresponding to the remote computer device;
combine interactive question components with the content item to create an interactive user interest survey that requests a response from potential recipients of the interactive user interest survey;
identify a user based on a target profile associated with the interactive user interest survey and input received from the sender entity, wherein the target profile indicates at least one user characteristic;
identify a mobile device corresponding to the identified user to determine a format compatible with the mobile device;
format the interactive user interest survey based on the format determined to be compatible with the mobile device; and
distribute the formatted interactive user interest survey to the mobile device for presentation to the identified user, wherein the mobile device presents the content item and the interactive question components of the interactive user interest survey to the identified user.

2. The system of claim 1, wherein the mobile device corresponding to the identified user comprises a client component capable of displaying the interactive user interest survey to the user, the system further comprising instructions that, when executed by the at least one processor, cause the system to:
receive, from the client component, an interaction indicating the identified user's interest for each item presented in the interactive user interest survey; and
communicate an indication of the identified user's interest to an external server.

3. The system of claim 1, wherein the interactive user interest survey comprises a list of products and services for sale, the system further comprising instructions that, when executed by the at least one processor, cause the system to:
receive from the mobile device corresponding to the identified user, an interaction indicating the identified user's interest for each of the list of products and services, and communicate an indication of the identified user's interest to an external server; and
process the indication of the identified user's interest and report back to an interested party or the sender entity.

4. The system of claim 1, further comprising instructions that, when executed by the at least one processor, cause the system to:
generate, based on content items received from one or more additional sender entities, a plurality of interactive user interest surveys for distribution; and
manage distribution of the plurality of interactive user interest surveys to subscribers;
wherein the plurality of interactive user interest surveys is each retrievable based on specific categories of interactive user interest surveys, a specific sender entity from the additional sender entities associated with the interactive user interest surveys, or one or more user groups identified as consumers.

5. The system of claim 1, further comprising instructions that, when executed by the at least one processor, cause the system to identify the user by determining the user to be an appropriate target for the interactive user interest survey based on user preferences available for the user and the target profile associated with the interactive user interest survey.

6. The system of claim 5, further comprising instructions that, when executed by the at least one processor, cause the system to receive a user response to the interactive user interest survey.

7. The system of claim 1, further comprising instructions that, when executed by the at least one processor, cause the system to insert, based on a type of category associated with the content item, the interactive question components into the interactive user interest survey.

8. The system of claim 1, further comprising instructions that, when executed by the at least one processor, cause the system to identify the user based on user preferences associated with the user.

9. The system of claim 1, further comprising instructions that, when executed by the at least one processor, cause the system to:
register at least one of a plurality of users; and
facilitate the at least one of the plurality of users to specify user preferences for at least one category of interactive user interest surveys.

10. The system of claim 9, wherein the at least one category of interactive user interest surveys comprises real estate, software, and popular music.

11. The system of claim 1, further comprising instructions that, when executed by the at least one processor, cause the system to:
detect an interaction from the identified user;
identify a response to a question of the interactive user interest survey based on the detected interaction; and
communicate the response to an external server.

12. The system of claim 1, wherein the interactive user interest survey comprises one or more components including graphics, video content, textual content, or audio content, wherein the one or more components are adapted based on capabilities of the mobile device.

13. The system of claim 1, wherein the interactive user interest survey comprises multiple items, wherein a response received from the mobile device of the identified user comprises a follow-up action request, wherein the follow-up action request comprises a request for the sending entity to contact the identified user.

14. The system of claim 1, wherein the interactive user interest survey comprises metadata that provides a category identification.

15. A method comprising:
receiving a first content item and a second content item for presentation within a user interest survey from a computing device associated with a sender entity;

combining interactive question components with the first content item and the second content item to create an interactive user interest survey that requests a response from potential recipients of the interactive user interest survey;

assigning a target profile to the interactive user interest survey based on input received from the sender entity, wherein the target profile indicates at least one characteristic of users expected to be interested in the interactive user interest survey;

identifying a user based on determining that a characteristic associated with the user matches the at least one characteristic indicated in the target profile;

identifying a mobile device corresponding to the identified user to determine a format compatible with the mobile device;

formatting the interactive user interest survey based on the format determined to be compatible with the mobile device;

sending, via a network, the interactive user interest survey to a client component on the mobile device, wherein the interactive user interest survey comprises a first segment corresponding to the first content item and a second segment corresponding to the second content item to be displayed one segment at a time to the identified user;

receiving a user response to the interactive user interest survey.

16. The method of claim 15, wherein the user response is captured at least partially in audio form and is communicated to a server designated to receive responses captured at least partially in audio form.

17. The method of claim 15 further comprising:
receiving, from one or more users, registration information comprising a user profile, and a user preference setting comprising one or more categories of interactive user interest surveys.

18. The method of claim 17 further comprising:
receiving, from the one or more users, a subscription, wherein the subscription provides access to interactive user interest surveys corresponding to the subscription.

19. A system comprising:
at least one processor; and
at least one non-transitory computer readable storage medium storing instructions thereon that, when executed by the at least one processor, cause the system to:
receive a first content item and a second content item for presentation within a user interest survey from a computing device associated with a sender entity;
combine interactive question components with the first content item and the second content item to create an interactive user interest survey that requests a response from potential recipients of the interactive user interest survey;
assign a target profile to the interactive user interest survey based on input received from the sender entity, wherein the target profile indicates at least one characteristic of users expected to be interested in the interactive user interest survey;
identify a user based on determining that a characteristic associated with the user matches the at least one characteristic indicated in the target profile;
identify a mobile device corresponding to the identified user to determine a format compatible with the mobile device;
format the interactive user interest survey based on the format determined to be compatible with the mobile device;
send, via a network, the interactive user interest survey to the mobile device, wherein the interactive media comprises a first segment corresponding to the first content item and a second segment corresponding to the second content item to be displayed one segment at a time to the identified user; and
receive a user response to the interactive user interest survey.

* * * * *